March 25, 1958  L. R. GOLLADAY  2,828,480
TRAIN IDENTIFICATION SYSTEMS
Filed March 18, 1955
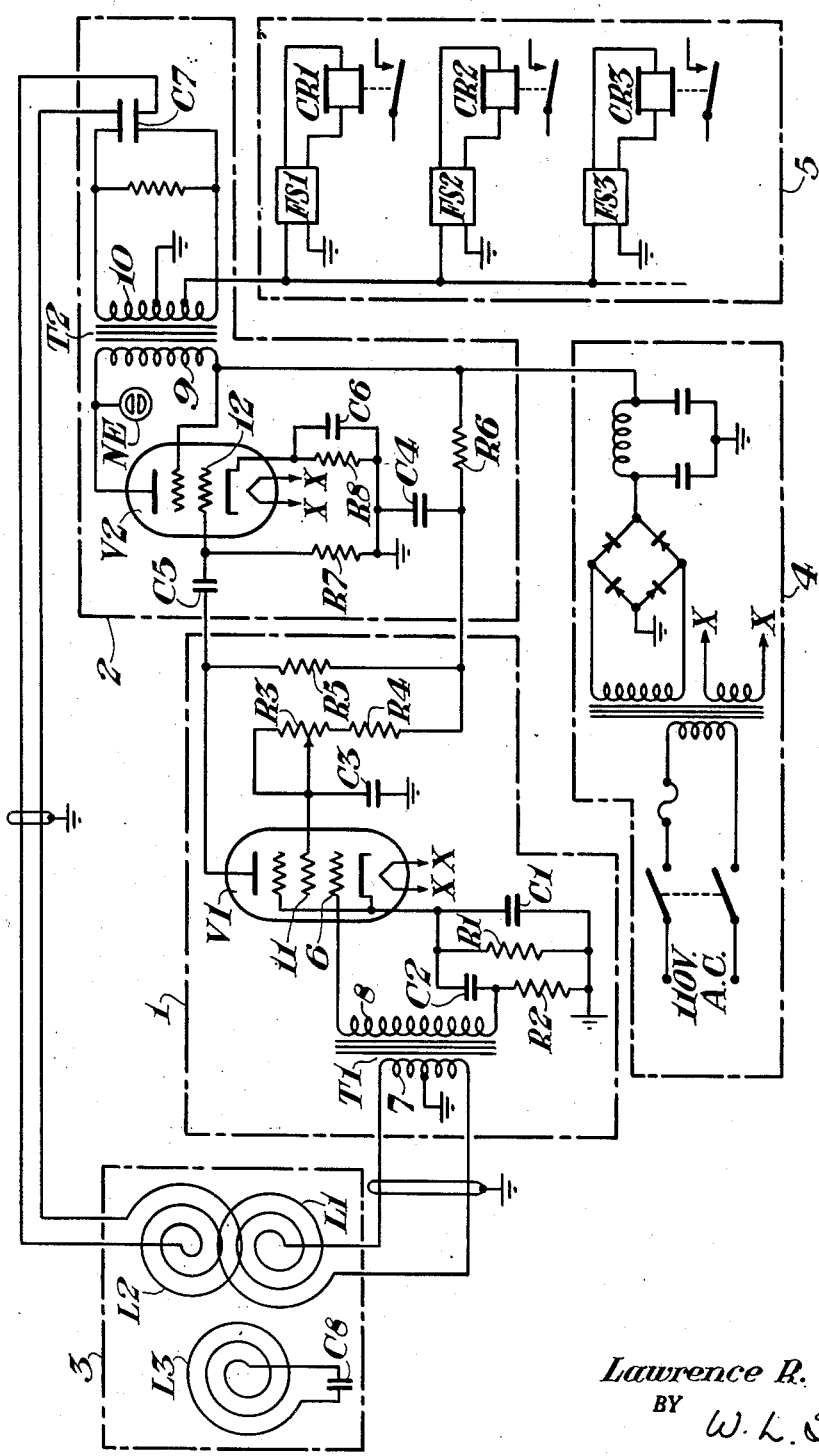
INVENTOR.
Lawrence R. Golladay
BY
W. L. Stout
HIS ATTORNEY United States Patent Office 2,828,480
Patented Mar. 25, 1958

2,828,480

TRAIN IDENTIFICATION SYSTEMS

Lawrence R. Golladay, Forest Hills, Pa., assignor to Westinghouse Air Brake Company, Wilmerding, Pa., a corporation of Pennsylvania Application March 18, 1955, Serial No. 495,223

15 Claims. (Cl. 340—258)

This invention relates to a system actuated by the presence of a vehicle or other object for automatically communicating information regarding the object, and more particularly describes a system wherein a vehicle or other object is classified and provided with a characterizing inductance according to its classification, and wherein wayside communication equipment is actuated upon the passage of the object to thereby provide information concerning the identity of the object in advance of the object's arrival at a particular location.

A practical example of a use for a system of this type would be a subway or any other means of transportation in which vehicles arriving from various origins and proceeding to various destinations may use the same roadway and stations and in which vehicles having different local and express classifications may use the same station.

In such cases, it would be extremely useful to communicate to a station in advance of the approaching vehicle information concerning the origin, destination and class of vehicle which is approaching.

The system of this invention would also be extremely useful for the control of automatic or manual route selection systems whereby routes for an approaching vehicle could be set up in advance in accordance with the identity or destination of the approaching vehicle.

Obviously, the use of the invention is not limited to identification of vehicles. It may be used, for example, to identify objects on a conveyor or assembly line which objects are to be handled according to their identity. Nor is it necessary that the vehicle or objects be moving, since motion is not essential to the operation of the invention. The system would function equally well, for example, if the objects to be identified were stationary and the apparatus comprising the invention were moved past the objects.

It is the primary object of this invention to teach construction of an extremely reliable object identification system characterized by unusual efficiency and simplicity not heretofore obtained. The system herein disclosed is capable of reliably detecting the identity of a passing object and of effectively avoiding spurious response and yet employs only a bare minimum of structural elements.

It is also an object of this invention to teach a vehicle identification system wherein each vehicle to be identified carries an unenergized inductance tuned to resonance at a frequency selected in accordance with the predetermined classification of the vehicle.

This invention further contemplates the use of an untuned oscillator circuit located along the path to be traversed by the object or vehicle and normally in non-oscillating condition but responsive to the presence of a tuned object or vehicle-carried inductance to oscillate at the resonant frequency of the inductance.

Yet another object of this invention, is to provide, by means of a single oscillator stage and a single amplifier stage, oscillating energy of a frequency to selectively energize a selected one of several circuit paths. In this invention the output of a single oscillator stage and a single power amplifier stage can be employed with a plurality of frequency selective networks each comprising a frequency selective filter and a control relay to directly energize the control relay whose associated filter is tuned to a frequency corresponding to the frequency of the activating, vehicle-carried inductance. In this manner, complex frequency-sweeping networks for the oscillator and/or duplicate amplifier stages for each frequency selective network are avoided.

These and other objects, characteristics and advantages of this invention will become readily apparent from a study of the accompanying drawing and specification.

The accompanying drawing is a diagrammatic representation of the structure and orientation of the elements comprising the invention.

It may be seen from the drawing that the system comprises five basic portions enclosed by dot and dash lines identified by the numerals 1 through 5.

The numeral 1 identifies the oscillator or first amplifier stage which includes vacuum tube V1 connected as a high-gain, resistance-coupled amplifier.

The numeral 2 designates a power-amplifier stage including a vacuum tube V2 feeding into an output transformer T2.

A coupling and detecting network made up of input coupling inductance L1, output coupling inductance L2 and a vehicle-carried, tuned inductance L3 is identified by the numeral 3.

The numeral 4 designates a rectified power supply for the amplifiers V1 and V2 and the numeral 5 indicates a utilization network which includes a plurality of frequency selective units FS1, FS2 and FS3 and their respectively associated control relays CR1, CR2 and CR3.

Amplifiers V1 and V2 are connected in cascade and a feed-back circuit to the grid 6 of V1 is provided by means of output coil L2 and input coil L1. Coils L1 and L2 are orientated with respect to each other so that zero or minimum inductive coupling occurs between the two coils and there is insufficient feedback to the control grid 6 of V1 to cause oscillation. However, when an inductance L3 is brought into proximity with the coils L1 and L2, a feed-back path will be completed from output coil L2 to coil L3 and thence to input coil L1. When the value of the feed-back energy to amplifier V1 becomes of sufficient magnitude, oscillation will occur. Since V1 operates into an untuned circuit, oscillation will occur at a frequency determined by the frequency of the feed-back energy applied through inductance L3. Therefore, it is obvious that by tuning this inductance to resonance at a predetermined frequency, amplifier V1 may be made to oscillate at any frequency thus selected.

Investigating more closely the nature of the invention, it will be seen that the input coil L1 is coupled to control grid 6 of amplifier V1 by means of an input transformer T1 having a primary winding 7 and a secondary winding 8. Winding 7 has its center point grounded to eliminate the effect of electro static coupling through coil L1. Similarly, output coil L2 is coupled to power amplifier V2 through output transformer T2 which has a primary winding 9 and a secondary winding 10 has its center point grounded to further help eliminate the effect of electro static coupling between the coils L1 and L2.

It is desirable to limit the feed-back circuit to inductive coupling because electro static coupling is more susceptible to variations due to moisture, temperature and ground capacity. For this reason, the accuracy with which the zero coupling or non-oscillating settings of the coils L1 and L2 could be obtained would be greatly diminished if the effects of electro static coupling were not eliminated. Likewise, the reliability of the system would be greatly impaired because the degree of coupling due to electro static coupling resulting from the presence of tuned inductance L3 would vary excessively under different conditions.

The components in the grid-cathode circuit of V1 are proportioned so that only a small negative bias is on grid 6. This bias is developed across resistor R1 in multiple with capacitor C1. The very small negative bias means that tube V1 will be operated on the high transconductance portion of its characteristic curve.

However, with only a small negative grid bias, there would be a tendency to over-drive the tube when oscillation began and to distort the wave form of the oscillations thereby introducing extraneous harmonics. To minimize this tendency a limiting network comprising a capacitor C2 and a resistor R2 of relatively high resistance value is placed in the grid circuit of V1.

It may readily be seen that when the input voltage to control grid 6 approaches a value which might cause over-driving of the tube V1 and current flows in the grid-cathode circuit during positive peaks of the input wave-form, a high negative grid bias will be developed across resistor R2 to reduce the tube gain. In this manner, wave-form distortion and objectionable harmonics are avoided.

It will occur to those skilled in the art that the feature just described will also help improve the selection characteristics of the band-pass frequency selective units shown within the block 5. By limiting the output voltage, the possibility of driving undesired frequencies through the frequency selective networks FS1, FS2 or FS3 to pick up one or more of the control relays CR1, CR2 or CR3 is prevented and thus the ability of the system to avoid response to spurious oscillation is improved.

Further control of the gain of amplifier V1 is provided by variable resistor R3 which is connected in series with resistor R4 and resistor R6 in the supply circuit for screen grid 11. If necessary, in addition to changing the positions of coils L1 and L2, the resistance of resistor R3 may be varied to lower the gain of amplifier V1 and prevent oscillation in the absence of a coil L3.

Capacitor C3 is a by-pass capacitor for the screen grid 11.

The alternating current developed across plate load resistor R5 in series with resistor R6 is applied through the coupling capacitor C5 to the control grid 12 of power amplifier tube V2. Tube V2 is connected substantially as a conventional power amplifier and has a grid resistor R7, cathode resistor and by-pass capacitors R8 and C6, respectively, and develops a plate output voltage across the primary winding 9 of output transformer T2.

Resistor R6 and capacitor C4 are employed as a decoupling network to prevent coupling from the plate and screen grid circuits of amplifier V2 through the power supply to the plate and screen grid circuits of tube V1.

Part of the output voltage from secondary winding 10 of transformer T2 is tapped off to operate the frequency selective units and the associated control relays.

As shown in the drawing, there are three frequency selective units FS1, FS2 and FS3 having associated control relays CR1, CR2 and CR3, respectively. The illustration, however, is by way of example only and fewer or more units may be provided, depending on the intended use of the system. It is also to be understood that an indicator or some other equipment may be controlled directly by the energy passed by the frequency selective units and the control relays may consequently be eliminated.

The purpose of capacitor C7 is to further enhance the ability of the system to reject spurious oscillation due to the presence of an untuned foreign body such as a metallic mass. If an untuned metallic mass should come into proximity with coils L1 and L2 there would be sufficient coupling between the input and output coils resulting to cause the system to oscillate. Inasmuch as the mass causing the oscillation is untuned, the frequency of oscillation will be principally determined by the reactances of the input coil, the output coil and capacitor C7. By selecting the value of C7, the frequency of spurious oscillations may be made sufficiently removed from the pass frequencies of the frequency selective units FS1, FS2 and FS3 that the energy due to such oscillation will be readily rejected.

As an added precautionary measure the connection from the output transformer to the output coil is made, as shown, through the plates of the capacitor C7. In this way, if the capacitor C7 should become open by the lead-in wires of the capacitor coming loose from one of the plates, as sometimes occurs, the feed-back circuit itself would become open and no oscillation could be sustained. In this way it would be evident that some failure has occurred. As an aid to the installation and service diagnosis of the equipment an oscillation indicator NE is provided. This indicator may be a neon glow lamp or similar device.

Tuning of the vehicle-carried coil L3 is accomplished by a series capacitor C8 calculated to produce resonance at the desired frequency. In practice, the coil L3 may be designed as a "plug-in" unit which can be quickly and easily attached or detached from the vehicle and the capacitor C8 may be a single fixed capacitor, a variable capacitor or may be one of a plurality of fixed capacitors connected to coil L3 and which can be selected by means of a switch to make coil L3 resonant at a selected one of several different frequencies.

The rectifier power supply shown within the block 4 is considered conventional and no description of its operation is required.

Now assume, for example, a subway installation where subway trains bound for three different destinations enter a common station. Three different frequencies will then be arbitrarily assigned, one to each destination, and vehicle-carried coils L3 designed to be resonant at each of the given frequencies. Each of the trains which is to proceed to a particular destination will then be provided with a vehicle-carried coil which will produce oscillation at the frequency associated with that destination or, if the selective type coil is employed, the switch will be set to select the capacitor which will tune the coil to resonance at the desired frequency.

At each wayside location where it is desired to detect and identify approaching trains there will be placed wayside equipment similar to that incorporated in the invention and comprising the oscillator V1, power amplifier V2, coils L1 and L2 and frequency responsive units FS1, FS2 and FS3 each of which will pass a different one of the assigned frequencies and each having associated therewith corresponding control relays CR1, CR2 and CR3.

Next, assume that a train bound for the destination which has been assigned a frequency $f2$ approaches and passes the wayside equipment. Assume, also, that frequency selective unit FS2 will pass energy having the frequency $f2$. Then, when the vehicle-carried coil L3 is close enough to coils L1 and L2 to cause sufficient energy to be coupled from the output circuit of output amplifier V2 to the input circuit of oscillator V1, oscillation will occur at the frequency $f2$ as determined by the tuning of coil L3. Indicator NE will become lighted and energy will pass through frequency selective network FS2 to pick up the associated control relay CR2. Contacts of relay CR2 may be used to control automatic route selection equipment, to provide an indication of an approaching train to an operator who will manually make route selections and/or manually operate equipment which will provide an indication at the common station of the identity of the approaching train or the relay contacts may automatically control such indication.

Operation of the system will be similar for trains bound for each of the other destinations except that an appropriate oscillation frequency $f1$ or $f3$ will be generated and the corresponding relay CR1 or CR3 will, accordingly, be operated.

If sufficient coupling from coil L1 to coil L2 occurs due to the presence of an untuned metallic mass, such as the side of a railway car, to support oscillation, the frequency of the oscillation, due to the value of C7, will be sufficiently removed from the pass frequencies of units FS1, FS2 and FS3 that the energy of these oscillations will be effectively rejected. None of the relays CR1, CR2 or CR3, therefore, will respond to such spurious activation of the oscillator.

Thus, it is seen, that a simple, efficient and reliable system for detecting the presence and identity of a vehicle or other object has successfully been devised.

Although only one form of the invention has been shown and described, it is obvious to those skilled in the art that various changes and modifications may be made within the scope of the invention. For example, power amplifier V2 may be eliminated and the control relays operated directly by energy from the oscillator V1, or, on the other hand, additional amplifier stages may be inserted between oscillator V1 and power amplifier V2. It is also contemplated that additional power output may be obtained by operating a push-pull power stage in place of the single-ended tube V2 and amplification stages may be inserted, if desired, in each of the frequency selective branches.

These and other modifications which may become apparent are deemed to lie within the scope of the invention as defined in the accompanying claims.

Having thus described my invention, what I claim is:

1. In a system for detecting and identifying an object, circuit means normally in a non-oscillating condition, feed-back means connected to said circuit means and adjusted to achieve a stable, non-oscillating condition of said circuit means, and circuit means carried by an object and effective when placed in proximity with said feed-back means to disturb the adjustment thereof and cause the application of feed-back energy to said first mentioned circuit means sufficient to support oscillation, the frequency of oscillation being determined by the electrical properties of the circuit means on said object whereby the object can be identified.

2. In a system for detecting and identifying, according to species, objects within each of several predetermined species; circuit means normally in non-oscillating condition, feed-back means connected to said circuit means and adjusted to obtain a stable, non-oscillating condition of said circuit means, and circuit means carried by each object and having electrical properties determined in accordance with the species of object on which it is carried, the circuit means carried by the object being effective when placed in proximity with said feed-back means to disturb the adjustment thereof whereby feed-back energy sufficient to support oscillation is applied to said first mentioned circuit means, the frequency of oscillation being determined by the electrical properties of the circuit means on said object whereby the species of object can be determined.

3. In a circuit for detecting and identifying, according to species, objects belonging to each of several predetermined species; circuit means normally in non-oscillating condition, feed-back means connected to said circuit means and adjusted to obtain a stable, non-oscillating condition of said circuit means, circuit means carried by each object and having electrical properties determined in accordance with the species of object, the circuit means on the object being effective when placed in proximity with said feed-back means to disturb the adjustment thereof and cause the application of feed-back energy sufficient to support oscillation to said first mentioned circuit means, the frequency of oscillation being determined by the electrical properties of the circuit means on the object, and means for detecting the frequency of oscillation to thereby determine the species of the object.

4. In a circuit for detecting and identifying, according to species, objects belonging to each of several predetermined species; circuit means normally in non-oscillating condition, feed-back means connected to said circuit means and adjusted to obtain a stable, non-oscillating condition of said circuit means, circuit means carried by each object and having electrical properties determined in accordance with the species of object, the circuit means on the object being effective when placed in proximity with said feed-back means to disturb the adjustment thereof and cause the application of feed-back energy sufficient to support oscillation to said first mentioned circuit means, the frequency of oscillation being determined by electrical properties of the circuit means on the object, and indicating means at a remote location and controlled in accordance with the frequency of oscillation to indicate the species of object.

5. In a circuit for detecting and identifying, according to species, objects belonging to each of several predetermined species; circuit means normally in non-oscillating condition, feed-back means connected to said circuit means and adjusted to obtain a stable, non-oscillating condition of said circuit means, circuit means carried by each object and having electrical properties determined in accordance with the species of object, the circuit means on the object being effective when placed in proximity with said feed-back means to disturb the adjustment thereof and cause the application of feed-back energy sufficient to support oscillation to said first mentioned circuit means, the frequency of oscillation being determined by electrical properties of the circuit means on the object, means for detecting the frequency of oscillation to thereby determine the species of the object, and indicating means at a remote location and controlled by said frequency detecting means to announce the species of the object.

6. In a system for detecting and identifying, according to species, objects within each of several predetermined species; circuit means normally in non-oscillating condition, feed-back means connected to said circuit means and adjusted to obtain a stable, non-oscillating condition of said circiut means, circuit means carried by each object and having electrical properties determined in accordance with the species of object on which it is carried, the circuit means carried by the object being effective when placed in proximity with said feed-fack means to disturb the adjustment thereof whereby feed-back energy sufficient to support oscillation is applied to said first mentioned circuit means, the frequency of oscillation being determined by the electrical properties of the circuit means on said object whereby the species of object can be determined, and means controlled in accordance with the frequency of oscillation to announce at a remote location the species of object.

7. In a system for detecting and identifying an object, circuit means normally in a non-oscillating condition, feed-back means connected to said circuit means and adjusted to obtain a stable, non-oscillating condition of said circuit means, and unenergized circuit means carried by an object and effective when placed in proximity with said feed-back means to disturb the adjustment thereof and cause the application of feed-back energy to said first mentioned circuit means sufficient to support oscillation, the frequency of oscillation being determined by the electrical properties of the circuit means on said object whereby the object can be identified.

8. In a system for detecting and identifying, according to the species, objects within each of several predetermined species; circuit means normally in non-oscillating condition, feed-back means connected to said circuit means and adjusted to obtain a stable, non-oscillating condition of said circuit means, and an unenergized circuit means carried by each object and having electrical properties determined in accordance with the species of object on which it is carried, the circuit means carried by the object being effective when placed in proximity with said feed-back means to disturb the adjustment thereof whereby feed-back energy sufficient to support oscillation is applied to said first mentioned circuit means, the frequency of oscillation being determined by the electrical properties of the circuit means on said object whereby the species of object can be determined.

9. In a vehicle identification system for determining the classification of vehicles within each of several predetermined classifications, circuit means normally in a non-oscillating condition, feed-back means connected to said circuit means and adjusted to achieve a stable, non-oscillating condition of said circuit means, and circuit means carried by each vehicle and effective when placed in proximity with said feed-back means to disturb the adjustment thereof whereby feed-back energy sufficient to support oscillation is applied to said first mentioned circuit means, the frequency of oscillation being determined by the electrical properties of the circuit means on said object and being related to the classification of the vehicle whereby the vehicle can be identified.

10. A system for determining the classification of objects belonging to each of several predetermined classes, the system comprising; electronic amplifier means, a source of power for energizing said amplifier means, feed-back means connected to said amplifier means and adjusted to obtain a stable, non-oscillating condition of said amplifier means, unenergized circuit means carried by each of the objects to be identified and having electrical characteristics determined in accordance with the classification of the object, the circuit means on the object being effective when placed in promixity with said feed-back means to disturb the adjustment thereof and cause the application to said amplifier means of feed-back energy sufficient to support oscillation, the frequency of oscillation being determined by the electrical properties of the circuit means on the object, and frequency responsive means for indicating the classification of each object.

11. A system for determining the classification of objects belonging to each of several predetermined classes, the system comprising; electronic amplifier means, a source of power for energizing said amplifier means, feed-back means connected to said amplifier means and adjusted to obtain a stable, non-oscillating condition of said amplifier means, unenergized circuit means carried by each of the objects to be identified and having electrical characteristics determined in accordance with the classification of the object, the circuit means on the object being effective when placed in proximity with said feed-back means to disturb the adjustment thereof and cause the application to said amplifier means of feed-back energy sufficient to support oscillation, the frequency of oscillation being determined by the electrical properties of the circuit means on the object, frequency responsive means for indicating the classification of each object and means for affecting the frequency of spurious oscillation caused by the presence of an untuned foreign object in proximity with said feed-back means whereby said frequency responsive means will not respond to such spurious oscillation.

12. A system for determining the classification of objects belonging to each of several predetermined classes, the system comprising electronic amplifier means, a source of power for energizing said amplifier means, feed-back means connected to said amplifier means and adjusted to obtain a stable, non-oscillating condition of said amplifier means, unenergized circuit means carried by each of the objects to be identified and having electrical characteristics determined in accordance with the classification of the object, the circuit means on the object being effective when placed in proximity with said feed-back means to disturb the adjustment thereof and cause the application to said amplifier means of feed-back energy sufficient to support oscillation, the frequency of oscillation being determined by the electrical properties of the circuit means on the object, frequency responsive means for indicating the classification of each object, and means for limiting the gain of said amplifier during oscillation to improve the wave form of oscillation energy thereby maintaining the accuracy of the frequency of oscillation in accordance with the electrical characteristics of said unenergized circuit means.

13. A frequency selective system comprising an amplifier, an input inductance connected to the input circuit for said amplifier, a power amplifier connected in cascade with said first mentioned amplifier, an output inductance connected to the output circuit for said power amplifier and arranged with respect to said input inductance to obtain minimum mutual coupling, said inductances being effective when placed in proximity with a disturbing inductive object to cause oscillation of said amplifiers at a frequency determined by the electrical characteristics of said inductive object, and at least one frequency selective unit connected in multiple with said output inductance and effective to pass only energy of a predetermined band of frequencies.

14. A frequency selective system comprising an amplifier, an input inductance connected to the input circuit for said amplifier, a power amplifier connected in cascade with said first mentioned amplifier, an output inductance connected to the output circuit for said power amplifier and arranged with respect to said input inductance to obtain minimum mutual coupling, said inductances being effective when placed in proximity with a disturbing inductive object to cause oscillation of said amplifiers at a frequency determined by the electrical characteristics of said inductive object, at least one frequency selective unit connected in multiple with said output inductance and effective to pass only energy of a predetermined band of frequencies, and means for limiting the gain of said amplifiers during their oscillating condition to improve the output wave form on the oscillation energy.

15. A frequency selective system comprising an amplifier, an input inductance connected to the input circuit for said amplifier, a power amplifier connected in cascade with said first mentioned amplifier, an output inductance connected to the output circuit for said power amplifier and arranged with respect to said input inductance to obtain minimum mutual coupling, an unbalancing inductance tuned to resonance at one of a number of predetermined frequencies and effective when placed in proximity with said input inductance and said output inductance to cause oscillation of said amplifiers at a frequency determined by the electrical characteristics of said unbalancing inductance, and a plurality of frequency selective units each effective to pass energy of a predetermined band of frequency including only one of said number of predetermined frequencies and to mutually exclude energy of frequencies passed by the other units.

References Cited in the file of this patent

UNITED STATES PATENTS 2,150,431    Drenkard  _____ Mar. 14, 1939
2,673,292    Treharne  _____ Mar. 23, 1954